Jan. 16, 1940. H. F. MacMILLIN 2,187,212
ELECTRIC CONTROL FOR PRESSES
Filed Aug. 24, 1936
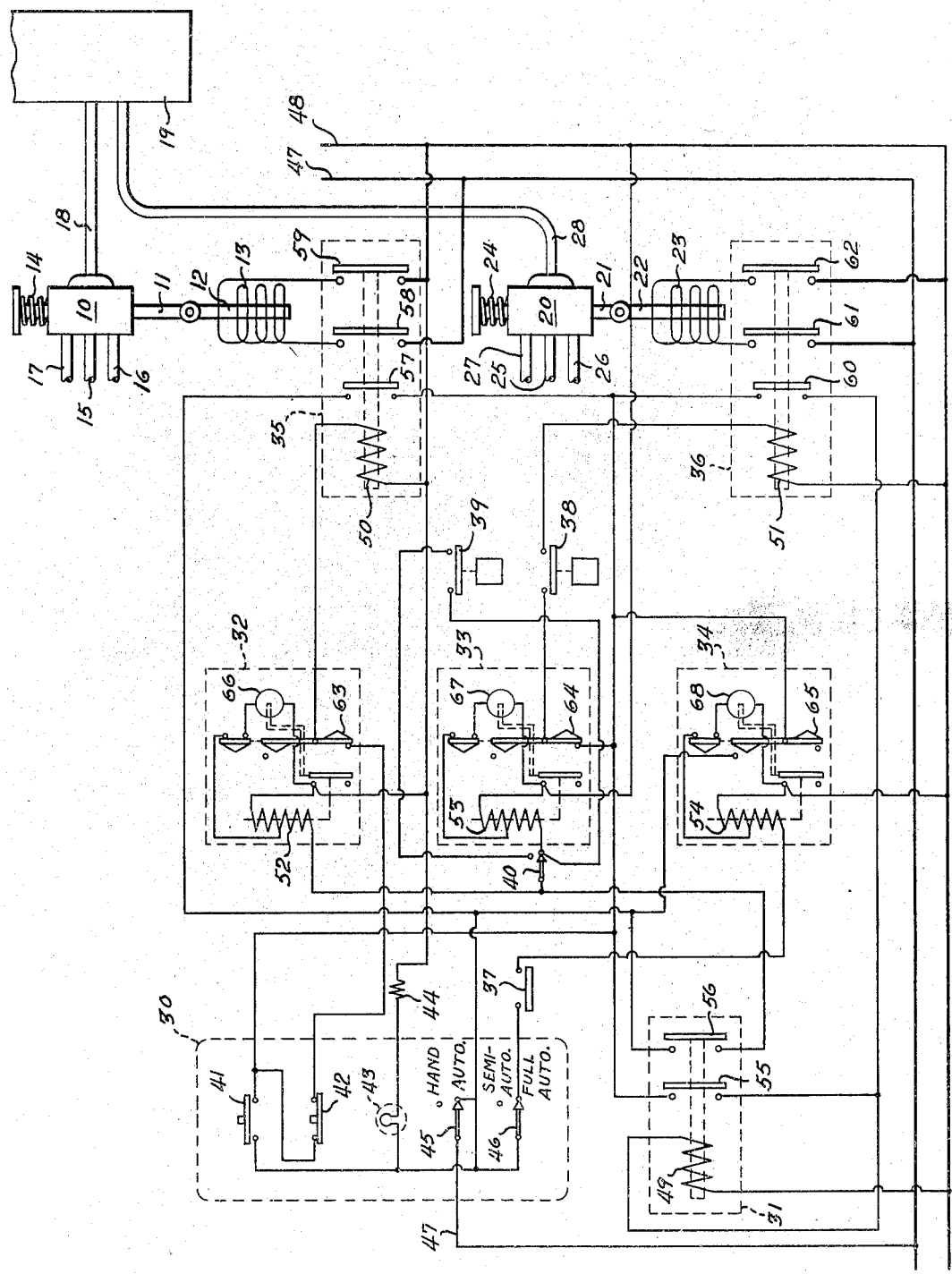
INVENTOR
HOWARD F. MacMILLIN
BY Toulmin & Toulmin
ATTORNEYS Patented Jan. 16, 1940

2,187,212

UNITED STATES PATENT OFFICE 2,187,212

ELECTRIC CONTROL FOR PRESSES

Howard F. MacMillin, Mount Gilead, Ohio, assignor to The Hydraulic Press Corporation, Inc., Wilmington, Del., a corporation of Delaware Application August 24, 1936, Serial No. 97,580

11 Claims. (Cl. 18—30)

This invention relates to electrical control systems, and in particular to such systems for controlling the operation of plastic extrusion molding presses.

One object of this invention is to provide an electrical control system for the automatic operation of the various elements in a plastic extrusion molding press so as to permit the operation of the press with a minimum of manual labor and attention.

Another object is to provide an electrical control system for a plastic extrusion molding press, wherein the clamping plunger for clamping the molding dies together actuates a circuit for putting in operation the injecting member for injecting the molding material into the dies.

Another object is to provide an electrical control system for a plastic extrusion molding press, wherein timing means is provided for causing the injection plunger to execute its forward stroke and to dwell a predetermined period of time at this point before returning to its starting position.

Another object is to provide an electrical control system for plastic extrusion presses, wherein time-responsive means is provided for causing the clamping plunger to execute a clamping stroke for clamping the dies, followed by an injection stroke of the injection plunger with a predetermined dwell thereof before its return to its starting position, the time-responsive means thereupon operating to allow the clamping plunger to execute its return stroke and open the molding dies.

Another object is to provide an electrical control system for plastic extrusion molding presses, wherein time-responsive means is provided for causing the die-clamping plunger to clamp the dies for a predetermined period of time while the injection plunger is making an injection stroke, dwelling at the forward portion of its stroke and returning to its starting position, after which the clamping plunger likewise returns to its starting position, this cycle of operations being repeated automatically without the necessity of attention upon the part of the operator.

Another object is to provide an electrical control system of the fully automatic type described in the preceding paragraph, wherein time delay means is provided at the end of the return stroke of the clamping plunger to permit a time delay to allow the dies to remain open for cooling and removal of the molded piece before a new cycle of operations is automatically resumed.

Another object is to provide an electrical control system for a plastic extrusion press of the type set forth in the foregoing objects, wherein means is provided for actuating the time dwell device for the injection plunger, the operation of which is initiated automatically when the injection plunger has completed its forward stroke.

The drawing shows one embodiment of the electrical control system of this invention.

In general, the electrical control system of this invention is adapted for use with an injection molding press, also known as a plastic extrusion molding press, for operating such presses automatically. The details of the press itself form no part of the present invention, and the system is adapted for use with various types of presses. This system, for example, may be used to operate the control valves of the plastic extrusion presses shown in the copending Shaw application, Ser. No. 79,954, filed May 15, 1936, and also in the Shaw, et al. application, Ser. No. 18,712, filed April 29, 1935. Both of these applications show manually operated valves, and it is the purpose of the present invention to control these valves automatically so as to execute a predetermined cycle of operations without the necessity of attention or strict supervision on the part of the operator.

The plastic extrusion molding press which this system is adapted to control consists primarily of a pair of separable molding dies having a hydraulic clamping plunger for clamping the dies together, and a hydraulic injecting or extrusion plunger for injecting the molding material into the dies after they have been clamped together by the clamping plunger. Hitherto, the operation of plastic extrusion molding presses has been manually controlled. The successful molding of plastic products by means of such presses requires time delays or dwells at certain points in the cycle of operations, and these dwells have been hitherto provided as a result of the attention of the operator and his manual manipulation of the valves. In particular, three dwells are preferable, first, a dwell with the dies closed and with the extrusion or injection plunger in its forward or injection position; second, a dwell with the dies closed and the extrusion plunger in its return or rearward position; and third, a dwell with the extrusion plunger in its return position and with the clamping plunger in its open position, enabling the separated dies to permit the cooling of the work and its removal by the operator before a new cycle of operations commences. In the present invention the movement of the press plungers is controlled by the admission and release of pressure fluid by means of hydraulic valves, actuated by electrical solenoids, the latter being energized and deenergized in a predetermined manner during the operation of the electrical system described below.

Referring to the drawing in detail, there is shown a valve 10 for controlling the clamping ram of the press and having a valve rod 11 actuated by the armature 12 of a solenoid winding 13. A spring 14 opposes the action of the solenoid winding 13 and shifts the valve 10 when the solenoid winding 13 is deenergized. When the solenoid winding 13 is energized, the valve 10 is shifted to admit pressure fluid from the pump pressure line 15 to the line 16 leading to the forward side of the double-acting clamping plunger. When the solenoid winding 13 is deenergized, however, the spring 14 shifts the valve rod 11 of the valve 10 into a position permitting pressure fluid to flow from the pump line 15 into the line 17 leading to the return side of the double-acting die-clamping plunger, thereby causing it to execute a return stroke. The line 18 leads from the valve 10 to the fluid tank 19.

The action of the extrusion or injection plunger is similarly controlled by the valve 20 through the agency of its valve rod 21 connected to the armature 22 of the solenoid winding 23. A spring 24 similarly urges the valve rod 21 in the opposite direction from that brought about by the energization of the solenoid winding 23. The valve 20 receives pressure fluid from the line 25, and delivers it selectively to the opposite sides of the double-acting hydraulic injection plunger through one of the lines 26 or 27 When the solenoid winding 23 is energized so as to move the valve rod 21 to its lower position, fluid passes from the pressure fluid line 15, through the valve 20 and into the line 26 leading to the space above the injection plunger, and forcing it to execute a forward stroke. When the solenoid 23 is deenergized, however, the spring 24 urges the valve rod 21 upwardly so as to discharge pressure fluid into the line 27 leading to the return side of the injection plunger, and causing it to execute a return stroke. In either case, the fluid escaping from the opposite side of the double-acting injection plunger returns to the tank 19 by way of the line 28.

Electrical system

The electrical circuit for bringing about this operation, in addition to the solenoids 13 and 23 already described, consists of a manual switch assembly 30, a magnetic control relay, generally designated 31, a plurality of electrical time delay devices, generally designated 32, 33 and 34, and a pair of magnetic contactor switches, generally designated 35 and 36. Connected to the switch assembly 30 is a normally open clamping return limit switch 37 associated with the press, and adapted to be operated by the clamping plunger at a predetermined point on its return stroke. Associated with the timing device 33 is a normally open clamping pressure switch 38, adapted to be closed when the pressure in the clamping cylinder reaches a predetermined amount. Likewise associated with the timing device 33 is the normally open injection pressure switch 39, adapted to be closed when the pressure in the injection plunger cylinder exceeds a predetermined amount. This switch 39 may be placed in series with the timing device 33, or rendered inoperative by the selector switch 40. The switch assembly 30 contains a starting switch 41, an emergency reversing switch 42, and a pilot light 43 to indicate when the circuit is in operation and having a resistance 44 associated therewith. Also contained in this assembly are a hand-automatic selector switch 45 and a semi or full automatic selector switch 46, the latter being connected to the clamping return limit switch 37, as shown in the drawing. Electric current for energizing the circuit and causing the operation of its various elements is received from the lines 47 and 48, the former leading to the hand-automatic switch 45 of the switch assembly 30.

The magnetic control relay 31 and the magnetic contactor switches 35 and 36 are provided with operating coils 49, 50 and 51, respectively, and the timing devices 32, 33 and 34 are provided with motor winding coils 52, 53 and 54, respectively. The magnetic control relay 31 is adapted when energized to close its normally open switch blades 55 and 56. The magnetic contactor switch 50 when energized similarly closes its normally open switch blades 57, 58 and 59, and the magnetic contactor switch 36 closes its normally open switch blades 60, 61 and 62. The timing devices 32, 33 and 34 are adapted when operated to actuate their switch blades 63, 64 and 65 a predetermined time after the energization of their motor winding coils 52, 53 and 54, respectively.

Operation

To start the cycle of operations the operator sets the hand-automatic switch 45 in its automatic position, assuming that automatic operation is desired. He also sets the semi or full automatic switch 46 in either its semi-automatic or full automatic position. At the outset it will be assumed that the switch 46 is set in its full automatic position. It will be understood that by semi-automatic operation it is meant that the press executes a complete cycle of operation and then comes to rest, with the various plungers at the ends of their return strokes. With full automatic operation, however, the press continues to execute an unlimited number of complete cycles of operation in succession until the operation is halted by the action of the operator.

The operator now depresses the forward switch 41; current then passes from the line 47 by way of the hand-automatic switch 45, the forward switch 41, the normally closed reverse switch 42 and the normally closed switch blade 63 of the timing device 32, through the operating coil 50 of the magnetic contactor 35, causing its switch blades 57, 58 and 59 to be closed upon their contacts. When this action occurs the solenoid winding 13 is energized by current flowing from the lines 47 and 48 thereto through the switch blades 58 and 59, and shifts the valve 10 to its lower position wherein pressure fluid is admitted to the forward side of the clamping plunger, causing the latter to move on its forward stroke.

When the operator releases the forward switch 41 the contacts thereof open, but a holding circuit is provided to continue the energization of the operating coil 50 of the magnetic contactor switch 35. This holding circuit is established through the now closed switch blade 57 of the magnetic contactor switch 35, and continues to energize the operating coil 50 thereof by current passing from the line 47 by way of the hand-automatic switch 45, the contactor switch blade 57, the normally closed reverse switch 42, the normally closed switch blade 63 of the timing device 32, through the operating coil 50 and thence to the line 48. In this manner the solenoid 13 continues to be energized, and continues to hold the valve 10 in its position of supplying the clamping plunger with pressure fluid for its forward stroke.

If an emergency arises, however, and it is necessary to stop the press, the operator depresses the reverse switch 42, thereby breaking the holding circuit just described, whereupon the operating coil 50 of the magnetic contactor switch 35 will be deenergized, allowing its switch blades 57, 58 and 59 to open, thereby deenergizing the solenoid winding 13. When this occurs the spring 14 shifts the valve rod 11 of the valve 10 to its opposite position, removing pressure from the forward side of the double-acting clamping plunger and admitting pressure fluid to the return side thereof, thereby causing the clamping plunger to execute a return stroke immediately, regardless of the position which it has reached on its forward stroke. This reverse switch 42 is provided for emergency use, and is not employed in normal operation.

Assuming that no emergency has arisen and that the control circuit is not broken by pressing the reverse switch 42, the clamping plunger continues to move forward until the molding dies are closed. The pressure continues to build up within the clamping plunger cylinder, however, and actuates the normally open clamping pressure switch 38 when a predetermined pressure is reached. This switch 38 does not break the original circuit, but energizes the extrusion or injection plunger operating circuit by permitting current to flow from the now closed switch blade 57 of the magnetic contactor switch 35 by way of the normally closed switch blade 64 of the timing device 33 and the now closed blade of the clamping pressure switch 38, and through the operating coil 51 of the magnetic contactor 36, causing the normally open switch blades 60, 61 and 62 thereof to close. This action energizes the solenoid winding 23 and shifts the valve 20 to its lower position against the urge of the spring 24, thereby admitting pressure to the forward side of the double-acting hydraulic extrusion plunger, causing it to execute an injection stroke to force the molding material into the space within the now closed dies.

At the same instant a timer starting circuit is set in operation through the closing of the switch blade 60, current therefrom enerizing the operating coil 49 of the magnetic relay 31, closing the switch blades 55 and 56 of the latter. When this occurs the motor winding coils 52 and 53 of the timing devices 32 and 33 are energized from the line 47, by way of the hand-automatic switch 45 and the now closed switch blade 56, starting the timing motors 66 and 67 on their respective cycles. The timing motor 68 of the timing device 34, however, is not started because its winding coils 54 are not yet energized. The timing device 33 is so adjusted that its cycle of operation is completed in a shorter time than that of the timing device 32. Moreover, the timing device 33 is so adjusted that sufficient time is allowed to permit the injection plunger to execute its forward stroke and to dwell at the end thereof for a desired length of time. When this time has elapsed the motor 67 of the timing device 33 opens the normally closed timing switch 64 and causes the energization circuit of the operating coil 51 of the magnetic contactor 36 to be broken. This action deenergizes the solenoid winding 23 and allows the valve 20 to be shifted to its opposite position, under the urge of the spring 24, thereby removing pressure from the forward side of the double-acting injection plunger and causing pressure fluid to be admitted to the return side thereof. The injection plunger then returns to starting position. Under this arrangement, therefore, the timing devices 32 and 33 are set in operation when the molding dies have been closed and the clamping pressure has been built up to a predetermined amount.

Although the magnetic contactor switch 36 has been deenergized and its switch blade 60 opened, a holding circuit for the magnetic relay 31 is still maintained in an energized condition through the now closed switch blade 55 thereof, this circuit receiving current by way of the now closed switch blade 57 of the magnetic contactor switch 35. Accordingly, the magnetic control relay 31 remains energized and closed even though the magnetic contactor switch 36 has been deenergized and opened.

When the timing device 32 has run through its time cycle, this motor 66 opens its switch blade 63, breaking the circuit which energizes the operating coil 50 of the magnetic contactor 35. The consequent deenergization of the latter causes its switch blades 57, 58 and 59 to open, thereby deenergizing the solenoid winding 13 and permitting the valve 10 to return to its upper position under the urge of the spring 14. This action causes pressure fluid to be removed from the forward side of the clamping plunger, and admits it to the return side thereof, causing the clamping plunger to execute a return stroke. When the clamping plunger reaches a predetermined position upon its return stroke, it encounters the clamping return limit switch 37 and closes this normally open switch. The closing of the limit switch 37 now energizes the timing device 34 for permitting a dwell at the end of the return stroke of the clamping plunger. The purpose of this dwell is to provide a delay with the molding dies open, so as to permit the cooling and removal of the molded pieces before the press starts to execute another cycle of operations. This, of course, assumes that the switch 46 of the switch assembly 30 has been set by the operator in the full automatic position. If it has been set in the semi-automatic position the closing of the clamping return limit switch 37 has no effect whatever, and nothing further occurs until the forward switch 41 is again depressed by the operator to start another cycle of operations.

With full automatic operation, however, the closing of the clamping return limit switch permits current to flow from the line 47, through the hand-automatic switch 45, the selector switch 46, the now closed clamping return limit switch and the motor winding coils 54 of the timing device 34 to the line 48, starting the timing motor 68 thereof in operation. When the timing device 34 has run through its cycle of operation, the motor 68 closes its normally open switch blade 65. This action permits current to pass from the line 47, through the hand-automatic switch 45 by way of the now closed timing switch 65 of the timing device 34, the reverse switch 42, the normally closed switch blade 63 of the timing device 32, through the operating coil 50 of the magnetic contactor switch 35 and across the line 48, energizing the coil 50 and closing the magnetic contactor 35. This action again energizes the solenoid winding 13, shifting the clamping control valve 10 to its position for causing a forward stroke of the clamping plunger, and initiating a new cycle of operations duplicating the cycle just described. The operation of the timing device 34 in full automatic operation eliminates the necessity for the operator having to depress the starting switch 41 in order to start a new cycle of operations. If, however, the selector switch 46 is set to the semi-automatic position it is necessary for the operator to depress the starting switch 41 to start this new cycle of operations.

As above described, the operation of the timing device 33 is initiated when the clamping plunger has completed its forward stroke. Under these circumstances the timing device 33 must be set for a sufficient time interval to permit the injection plunger to execute its injection stroke and such dwell as may be desired at the end of this stroke. If, however, it is desired to delay the operation of the timing device 33 until the injection plunger has completed its forward stroke, the switch 40 is shifted to its upper position, thereby throwing the normally open injection pressure switch 39 into series with the motor winding coil 53 of the timing device 33. Under these circumstances the timing device 33 is not energized and started in operation until the injection plunger has completed its forward stroke, and a pressure has been built up within the injection plunger cylinder sufficient to shift the pressure switch 39 and close its normally open switch blade. When this occurs the effect of the additional switches 39 and 40 is removed because both are closed and the timing device 33 is energized and starts its operation, in a manner similar to that previously described. Under this arrangement of the switch 40, therefore, the time delay caused by the operation of the timing device 33 is measured from the end of the forward injection stroke rather than from the beginning of this stroke.

It will be understood that I desire to comprehend within my invention such modifications as come within the scope of the claims and the invention.

Having thus fully described my invention, what I claim as new and desire to secure by Letters Patent, is:

1. In a control system for a plastic molding press, a hydraulic die-clamping plunger, a hydraulic injection plunger movable through forward and return strokes, reversible control valves for reversibly controlling the distribution of pressure fluid to said plungers, an electrical device for shifting and reversing each control valve, and a timing device for actuating the clamping control valve electrical device to shift said clamping control valve to effect a movement of the clamping plunger into a clamping position at the expiration of a predetermined period of time after the clamping plunger has reached the end of its return stroke.

2. In a control system for a plastic molding press, a hydraulic die-clamping plunger, a hydraulic injection plunger movable through forward and return stroke, reversible control valves for reversibly controlling the distribution of pressure fluid to said plungers, an electrical device for shifting and reversing each control valve, and a pressure-responsive device for effecting the operation of the injection control valve reversing device to effect a forward stroke of said injection plunger in response to the building up of a predetermined pressure against said hydraulic clamping plunger.

3. In a control system for a plastic molding press, a hydraulic die-clamping plunger, a hydraulic injection plunger movable through forward and return strokes, reversible control valves for reversibly controlling the distribution of pressure fluid to said plungers, an electrical device for shifting and reversing each control valve, a pressure-responsive device for effecting the operation of the injection control valve reversing device to effect a forward stroke of said injection plunger in response to the building up of a predetermined pressure against said hydraulic clamping plunger, and timing means for actuating the injection control valve electrical device to shift the injection control valve to effect a retraction movement of the injection plunger at the expiration of a predetermined period of time after the actuation thereof in response to the operation of said pressure-responsive device.

4. In a control system for a plastic molding press, a hydraulic die-clamping plunger, a hydraulic injection plunger movable through forward and return strokes, reversible control valves for reversibly controlling the distribution of pressure fluid to said plungers, an electrical device for shifting and reversing each control valve, a timing device for actuating the injection control valve electrical device to shift said injection control valve to effect an injection stroke of the injection plunger at the expiration of a predetermined period of time after the clamping plunger has reached the end of its forward stroke, and timing means for actuating the clamping control valve electrical device to shift the clamping control valve to effect another forward movement of said clamping plunger at the expiration of a predetermined period of time after said clamping plunger reaches the end of its return stroke.

5. In a control system for a plastic molding press, a hydraulic die-clamping plunger, a hydraulic injection plunger movable through forward and return strokes, reversible control valves for reversibly controlling the distribution of pressure fluid to said plungers, an electrical device for shifting and reversing each control valve, a pressure-responsive device for effecting the operation of the injection control valve electrical device to shift said injection control valve to effect an injection stroke of the injection plunger in response to the building up of a predetermined pressure against said hydraulic clamping plunger, timing means for actuating the injection control valve electrical device to shift the injection control valve to effect a retraction movement of the injection plunger at the expiration of a predetermined period of time after the actuation thereof in response to the operation of said pressure-responsive device, and a timing device for actuating the clamping control valve electrical device to shift said clamping control valve to effect a movement of the clamping plunger into a clamping position at the expiration of a predetermined period of time after said clamping plunger reaches the end of its return stroke.

6. In a control system for a plastic molding press, a hydraulic die-clamping plunger, a hydraulic injection plunger movable through forward and return strokes, reversible control valves for reversibly controlling the distribution of pressure fluid to said plungers, an electrical device for shifting and reversing each control valve, a first timing device operative to reverse said clamping plunger control valve reversing device at the expiration of a predetermined period of time after the termination of the forward stroke of said clamping plunger, and a second timing device and running concomitantly with the first timing device but having a shorter time delay setting and adapted to operate said injection control valve reversing device and reverse said valve a predetermined period of time before the reversal of said clamping plunger control valve by said first-mentioned time-responsive device.

7. In a control system for a plastic molding press, a hydraulic die-clamping plunger, a hydraulic injection plunger movable through forward and return strokes, reversible control valves for reversibly controlling the distribution of pressure fluid to said plungers, an electrical device for shifting and reversing each control valve, a first timing device operative to reverse said clamping plunger control valve reversing device at the expiration of a predetermined period of time after the termination of the forward stroke of said clamping plunger, a second timing device and running concomitantly with the first timing device but having a shorter time delay setting and adapted to operate said injection control valve reversing device and reverse said valve a predetermined period of time before the reversal of said clamping plunger control valve by said first-mentioned timing device, and a third timing device adapted to reverse said clamping plunger control valve reversing device for initiating another forward stroke of the clamping plunger a predetermined period of time after said clamping plunger reaches the end of its return stroke.

8. In a control system for a plastic molding press, a hydraulic die-clamping plunger, a hydraulic injection plunger movable through forward and return strokes, a reversible control valve for reversibly controlling the distribution of pressure fluid to each of said plungers, an electrical shifting and reversing device adapted when energized to shift and reverse each of said control valves to its reversed position, a first timing device adapted to deenergize said clamping control valve-shifting device at the expiration of a predetermined period of time after the termination of the forward stroke of said clamping plunger, a second timing device adapted to energize said injection control valve-shifting device for a shorter predetermined period of time than the first-mentioned timing device, whereby to cause said injection plunger to complete its injection stroke after the clamping plunger reaches the end of its forward stroke and before said clamping plunger starts its return stroke, and means responsive to the building up of a predetermined pressure against said clamping plunger for effecting the operation of said second timing device.

9. In a control system for a plastic molding press, a hydraulic die-clamping plunger, a hydraulic injection plunger movable through forward and return strokes, a reversible control valve for reversibly controlling the distribution of pressure fluid to each of said plungers, an electrical shifting and reversing device adapted when energized to shift and reverse each of said control valves to its reversed position, a first timing device adapted to deenergize said clamping control valve-shifting device at the expiration of a predetermined period of time after the termination of the forward stroke of said clamping plunger, a second timing device adapted to energize said injection control valve-shifting device for a shorter predetermined period of time than the first-mentioned timing device, whereby to cause said injection plunger to complete its injection stroke after the clamping plunger reaches the end of its forward stroke and before said clamping plunger starts its return stroke, and a third timing device adapted to reenergize said clamping control valve-shifting means a predetermined period of time after said clamping plunger reaches the end of its return stroke.

10. In a control system for a plastic molding press, a hydraulic die-clamping plunger, a hydraulic injection plunger movable through forward and return strokes, a reversible control valve for reversibly controlling the distribution of pressure fluid to each of said plungers, an electrical shifting and reversing device adapted when energized to shift and reverse each if said control valves to its reversed position, a first timing device adapted to deenergize said clamping control valve-shifting device at the expiration of a predetermined period of time after the termination of the forward stroke of said clamping plunger, a second timing device adapted to energize said injection control valve-shifting device for a shorter predetermined period of time than the first-mentioned timing device, whereby to cause said injection plunger to complete its injection stroke after the clamping plunger reaches the end of its forward stroke and before said clamping plunger starts its return stroke, a third timing device adapted to reenergize said clamping control valve-shifting means a predetermined period of time after clamping plunger reaches the end of its return stroke, and means responsive to the building up of a predetermined pressure against said clamping plunger for effecting the operation of said second timing device.

11. In a control system for a plastic molding press, a hydraulic die-clamping plunger, a hydraulic injection plunger movable through forward and return strokes, a reversible control valve for reversibly controlling the distribution of pressure fluid to each of said plungers, an electrical shifting and reversing device adapted when energized to shift and reverse each of said control valves to its reversed position, a first timing device adapted to deenergize said clamping control valve-shifting device at the expiration of a predetermined period of time after the termination of the forward stroke of said clamping plunger, a second timing device adapted to energize said injection control valve-shifting device for a shorter predetermined period of time than the first-mentioned timing device, whereby to cause said injection plunger to complete its injection stroke after the clamping plunger reaches the end of its forward stroke and before said clamping plunger starts its return stroke, means responsive to the building up of a predetermined pressure against said clamping plunger for effecting the operation of said first timing device, and a second pressure-responsive means responsive to the building up of a predetermined pressure against said injection plunger for effecting the operation of said second timing device.

HOWARD F. MacMILLIN.